US009092577B2

(12) United States Patent
Chishiro

(10) Patent No.: US 9,092,577 B2
(45) Date of Patent: Jul. 28, 2015

(54) METHOD FOR GENERATING TEST DATA FOR EVALUATING PROGRAM EXECUTION PERFORMANCE

(75) Inventor: Eiichiro Chishiro, Yokohama (JP)

(73) Assignee: HITACHI, LTD., Tokyo (JP)

( * ) Notice: Subject to any disclaimer, the term of this patent is extended or adjusted under 35 U.S.C. 154(b) by 174 days.

(21) Appl. No.: 13/880,464

(22) PCT Filed: Feb. 2, 2011

(86) PCT No.: PCT/JP2011/000556
§ 371 (c)(1),
(2), (4) Date: Jun. 14, 2013

(87) PCT Pub. No.: WO2012/104907
PCT Pub. Date: Aug. 9, 2012

(65) Prior Publication Data
US 2013/0305095 A1    Nov. 14, 2013

(51) Int. Cl.
*G06F 11/00* (2006.01)
*G06F 11/36* (2006.01)
*G06F 11/34* (2006.01)

(52) U.S. Cl.
CPC ........ *G06F 11/3684* (2013.01); *G06F 11/3414* (2013.01); *G06F 11/3624* (2013.01);
(Continued)

(58) Field of Classification Search
CPC . G06F 11/3414; G06F 11/36; G06F 11/3604; G06F 11/3608; G06F 11/3612; G06F 11/362; G06F 11/3636; G06F 11/3664; G06F 11/3668; G06F 11/3672; G06F 11/3676; G06F 11/3684; G06F 11/3688; G06F 2201/865; G06F 2201/88
USPC ........................................ 714/38.1
See application file for complete search history.

(56) References Cited

U.S. PATENT DOCUMENTS 6,173,440 B1 *    1/2001   Darty ........................... 717/130
(Continued)

FOREIGN PATENT DOCUMENTS

JP    03-244043 A    10/1991
JP    09-259006 A    10/1997
(Continued)

OTHER PUBLICATIONS

Ghiduk, A.S.; Harrold, M.J.; Girgis, M.R., "Using Genetic Algorithms to Aid Test-Data Generation for Data-Flow Coverage," Software Engineering Conference, 2007. APSEC 2007. 14th Asia-Pacific, vol., No.,pp. 41,48, Dec. 4-7, 2007 doi: 10.1109/ASPEC.2007.73.*

(Continued)

*Primary Examiner* — Bryce Bonzo
*Assistant Examiner* — Anthony J Amoroso
(74) *Attorney, Agent, or Firm* — Mattingly & Malur, PC

(57) ABSTRACT

Test data used in evaluating the performance of a program is generated. First, a source program targeted for performance evaluation, sample data, and a generation parameter used for determining the size of the test data to be generated are received from an input device. A processor then executes the source program using the sample data and obtains the number of executions for each of a plurality of statements in the source program. In addition, on the basis of the obtained number of executions, the processor generates test data having a size that is a multiple of the generation parameter of the sample data size, the test data being such that the frequency of executions for each of the plurality of statements in the source program is the same as the frequency of executions for each of the plurality of statements when executing the source program using the sample data.

12 Claims, 9 Drawing Sheets

(52) U.S. Cl.
CPC ........ *G06F11/3668* (2013.01); *G06F 11/3676* (2013.01); *G06F 2201/865* (2013.01); *G06F 2201/88* (2013.01)

(56) References Cited

U.S. PATENT DOCUMENTS

| | | | |
|---|---|---|---|
| 6,959,431 B1 * | 10/2005 | Shiels et al. | 717/124 |
| 7,290,048 B1 * | 10/2007 | Barnett et al. | 709/223 |
| 8,473,915 B2 * | 6/2013 | Brodsky et al. | 717/124 |
| 2009/0007077 A1 * | 1/2009 | Musuvathi et al. | 717/130 |

FOREIGN PATENT DOCUMENTS

| | | |
|---|---|---|
| JP | 2000-020529 A | 1/2000 |
| JP | 2009-134662 A | 6/2009 |

OTHER PUBLICATIONS

Michael, C.C.; McGraw, Gary; Schatz, M.A., "Generating software test data by evolution," SoftwareEngineering, IEEE Transactions on, vol. 27, No. 12, pp. 1085,1110, Dec. 2001 doi: 10.1109/32.988709.*

Zhi-yong Wu; Le-Chang Sun; He-Ping Tang; Min Zhang; Jing-Ju Liu, "A Fuzzing technology with a datasample combination," Computer Engineering and Technology (ICCET), 2010 2nd International Conference on, vol. 2, No., pp. V2-140,V2-145, Apr. 16-18, 2010 doi: 10.1109/ICCET.2010.5485274.*

Steven Muchnick. Advanced Compiler Design and Implementation. Morgan Kaufmann, pp. 169-216, 1997.

Cristian Cadar, Daniel Dunbar, Dawson Engler. Klee: Unassisted and Automatic Generation of High-Coverage Tests for Complex Systems Programs. In Proceedings of Operating System Design and Implementation, pp. 209-224, 2008.

* cited by examiner

Fig. 4

```
             (a)
     Table t;
     void main()
     {
 1:    x = in();
 2:    while(x != -1) {
 3:      if(!find(x))
 4:        insert(x);
 5:      x = in();
       }
 6:    return;
     }
     int find(int a)
     {
 7:    int i = 0;
 8:    while(i < t.size) {
 9:      if(t.content[i] ==
a)
10:        return 1;
11:      i++;
       }
12:    return 0;
     }
     void insert(int b)
     {
13:    t.content[t.size] = b;
14:    t.size++;
     }
(b)
   1 1 2 -1
(c)
   2
```

```
        void main()
{
   x = in();
   assert(x != -1);
   assert(!find(x));
   insert(x);
   x = in();
   assert(x != -1);
   assert(find(x));
   x = in();
   assert(x != -1);
   assert(!find(x));
   insert(x);
   x = in();
   assert(x != -1);
   assert(!find(x));
   insert(x);
   x = in();
   assert(x != -1);
   assert(find(x));
   x = in();
   assert(x != -1);
   assert(!find(x));
   insert(x);
   x = in();
   assert(x == -1)
   return;
}
```

Fig. 7

| 3 3 4 5 3 6 -1 |

```
               (a)
      Table t;
      void main()
      {
 1:     x = in();
 2:     while(x != -1) {
 3:       if(!find(x))
 4:         insert(x);
 5:       x = in();
        }
 6:     z = x;
 7:     while(z != -2) {
 8:       insert(z);
 9:       z = in();
        }
10:     return;
      }
      int find(int a)
      {
11:     int i = 0;
12:     while(i < t.size) {
13:       if(t.content[i] == a)
14:         return 1;
15:       i++;
        }
16:     return 0;
      }
      void insert(int b)
      {
17:     t.content[t.size] = b;
18:     t.size++;
      }
(b)
  1 1 2 -1 7 3 -2
(c)
  2
```

```
void main()
{
  x = in(); assert(x != -1); assert(!find(x)); insert(x);
  x = in(); assert(x != -1); assert(find(x));
  x = in(); assert(x != -1); assert(!find(x)); insert(x);
  x = in(); assert(x != -1); assert(!find(x)); insert(x);
  x = in(); assert(x != -1); assert(find(x));
  x = in(); assert(x != -1); assert(!find(x)); insert(x);
  x = in(); assert(x == -1);
  z = x; assert(z != -2); insert(z);
  z = in(); assert(z != -2); insert(z);
  z = in(); assert(z != -2); insert(z);
  z = in(); assert(z != -2); insert(z);
  z = in(); assert(z == -2);
  return;
}
```

METHOD FOR GENERATING TEST DATA FOR EVALUATING PROGRAM EXECUTION PERFORMANCE

TECHNICAL FIELD

The present invention relates to the generation of test data to be used when evaluating the execution performance of a program executed by a computer.

BACKGROUND ART

The evaluation of execution performance is one step in the testing of a program. This evaluation is performed to make sure that the program that has been developed is capable of achieving the client-requested throughput standards when the program is actually run.

In order to accurately evaluate the execution performance when the program is actually run, test data similar to the data that will be inputted when the program is actually run must be prepared, and the program must be executed using the test data. A technique for generating test data for use in performance evaluation testing is thus required.

PTL 1 exists as prior art for producing test data for use in a performance evaluation. According to this technique, test data can be produced by providing database schema information and data production rules.

In addition, PTL 1 shows a method for producing a program that is used to produce test data for use in a performance evaluation.

CITATION LIST

Patent Literature

[PTL 1]
Japanese Patent Application Publication No. 2000-20529
[PTL 2]
Japanese Patent Application Publication No. 2009-134662

Non-Patent Literature

[NPL 1]
Steven Muchnick. Advanced Compiler Design and Implementation. Morgan Kaufmann, pp. 169-216, 1997.
[NPL 2]
Cristian Cadar, Daniel Dunbar, Dawson Engler. Klee: Unassisted and Automatic Generation of High-Coverage Tests for Complex Systems Programs. In Proceedings of Operating System Design and Implementation, pp. 209-224, 2008.

SUMMARY OF INVENTION

Technical Problem

There are two problems with these techniques. The first problem is that the user must specify the method for producing the test data. Thus, in order to produce test data whereby the behavior of the program targeted for performance evaluation will be similar to that when the program is actually run, the user must examine the source program and devise appropriate test data production rules or patterns. However, the task of ascertaining the behavior of the program from the source program and devising a method for producing test data is extremely difficult and takes a long time. Furthermore, specifiable methods for producing test data are limited, and as such, even when the kind of test data that should be produced has become clear, there are cases where it is not possible to specify a method for producing the appropriate test data.

The second problem is that the prior art is a technique for producing test data for database use, and can only be used in the performance evaluation of programs for use with databases.

Solution to Problem

First, a source program targeted for performance evaluation, sample data, and a generation parameter to be used for determining the size of the test data to be generated are received from an input device.

Then, a processor executes the source program using the sample data, and obtains the number of executions for each of a plurality of statements in the source program. In addition, the processor, on the basis of the obtained number of executions, generates test data having a size that is a multiple of the generation parameter of a size of the sample data, the test data being such that the frequency of executions for each of the plurality of statements in the source program is the same as the frequency of executions for each of the plurality of parts when executing the source program using the sample data.

Advantageous Effects of Invention

The user is able to obtain test data of an arbitrary size having execution characteristics in common with the sample data by simply preparing a small-scale sample data reflecting the tendency of data inputted when the program is actually run. This makes it possible to reduce the number of development steps needed to evaluate program performance.

BRIEF DESCRIPTION OF DRAWINGS

FIG. 4 is a drawing showing an example of input data used in the execution of a test data generation program.
FIG. 5 is a drawing showing an example of frequency of executions information.
FIG. 6 is a drawing showing an example of source program expansion.
FIG. 7 is a drawing showing an example of test data generated by the test data generation program.
FIG. 8 is a drawing showing an example of intermediate information.
FIG. 9 is a drawing showing an example of input data used in the execution of the test data generation program.
FIG. 10 is a drawing showing an example of frequency of executions information.
FIG. 11 is a drawing showing an example of source program expansion.
FIG. 12 is a drawing showing an example of test data generated by the test data generation program.

DESCRIPTION OF EMBODIMENTS

An example of an embodiment of the invention will be explained below using the drawings.

Figure 1:
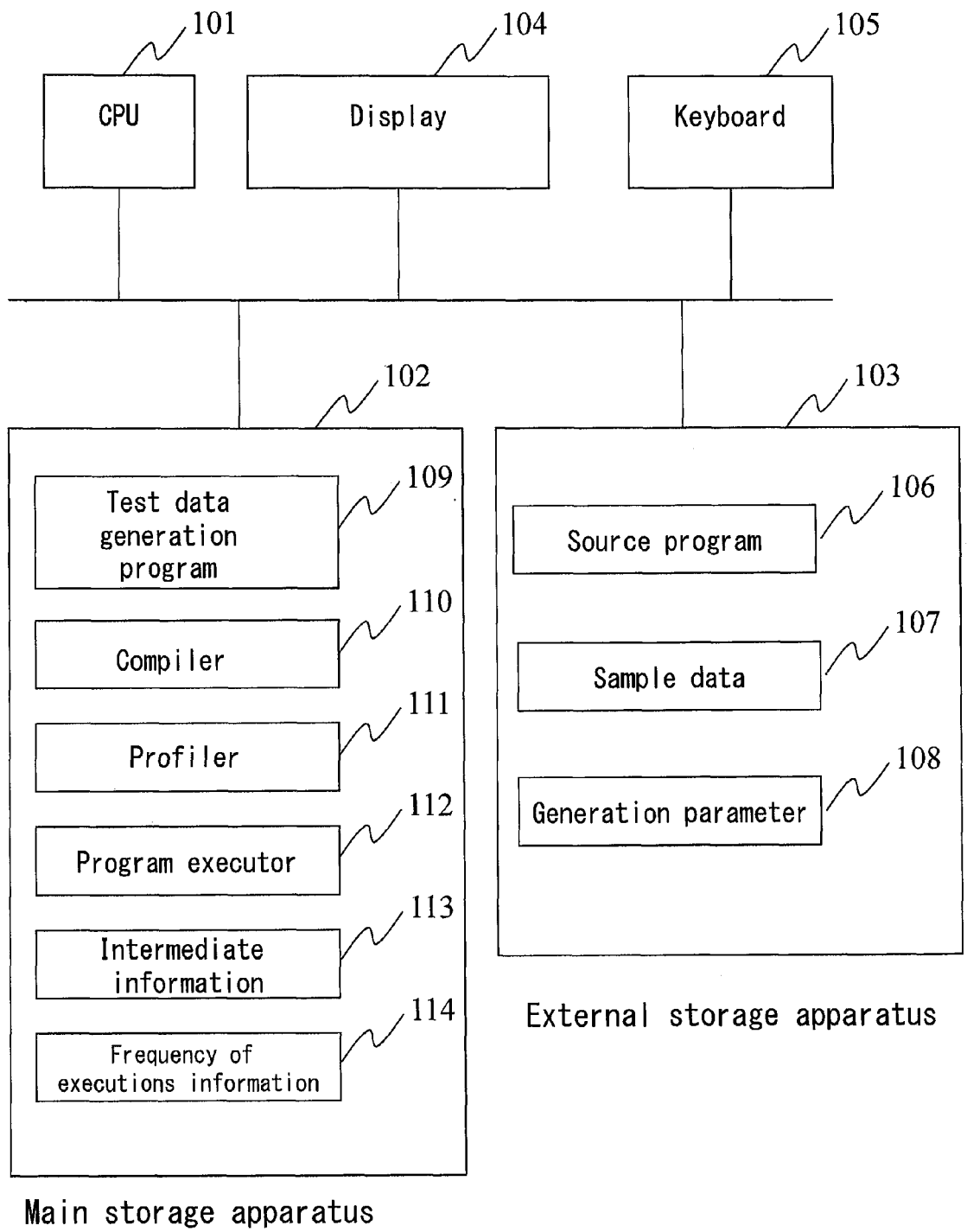
FIG. 1 is a drawing showing an example of the configuration of a computer system in which a test data generation device operates.

FIG. 1 is a drawing showing an example of the configuration of a computer system in which a test data generation device operates.

As shown in the drawing, a computer system comprises a CPU 101, a main storage apparatus 102, an external storage apparatus 103, an output device 104, such as a display, and an input device 105, such as a keyboard. A source program 106 that is targeted for performance evaluation, sample data 107, and a generation parameter 108 are inputted from the input device and stored in the external storage apparatus 103. The external storage apparatus 103 in which the source program 106, the sample data 107, and the generation parameter 108 are stored may be coupled so as to be accessible from the CPU 101 via an interface. A test data generation program 109, a compiler 110, a profiler 111, a program executor 112, an execution code 113, intermediate information 114, frequency of executions information 115, and test data 116 are held in the main storage apparatus 102. A test data generation process is performed by the CPU 101 executing the software stored in the main storage apparatus 102. The keyboard 105 is used to provide a user command to the test data generation program 109. The display 104 lets the user know that test data generation has ended.

Figure 2:
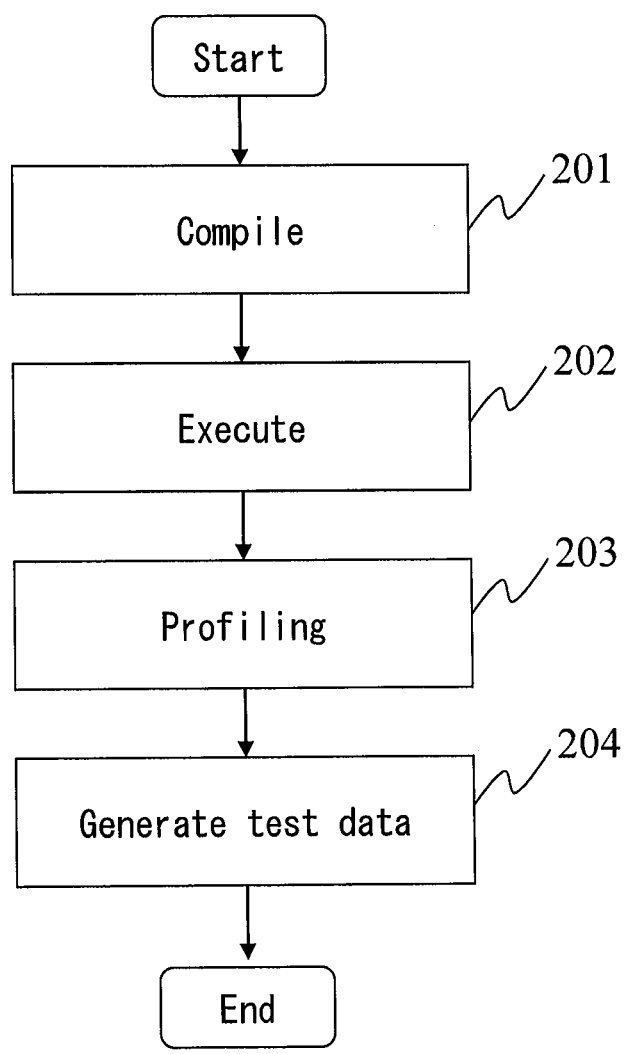
FIG. 2 is a drawing showing an example of a data generation process.

FIG. 2 is a flowchart showing the flow of processing for generating test data.

In the first Step 201, the compiler 110 is executed by the CPU 101, and an execution code 113 is generated from the source program 106 as a result thereof.

The compiler in Step 201 first generates a graph of basic blocks from the program. The graph of basic blocks treats a basic block (a string of non-branching statements) as a node, and is generally used in a compiler 110 for simplifying the generation of execution code. A method for generating a graph of basic blocks is described in NPL 1.

The statements in a basic block are executed from the top in sequence, and after all the statements have been executed, the compiler 110 moves to the execution of the basic block subsequent to this basic block (the basic block corresponding to the end point of the directed edge having this basic block as the start point).

Figure 13:
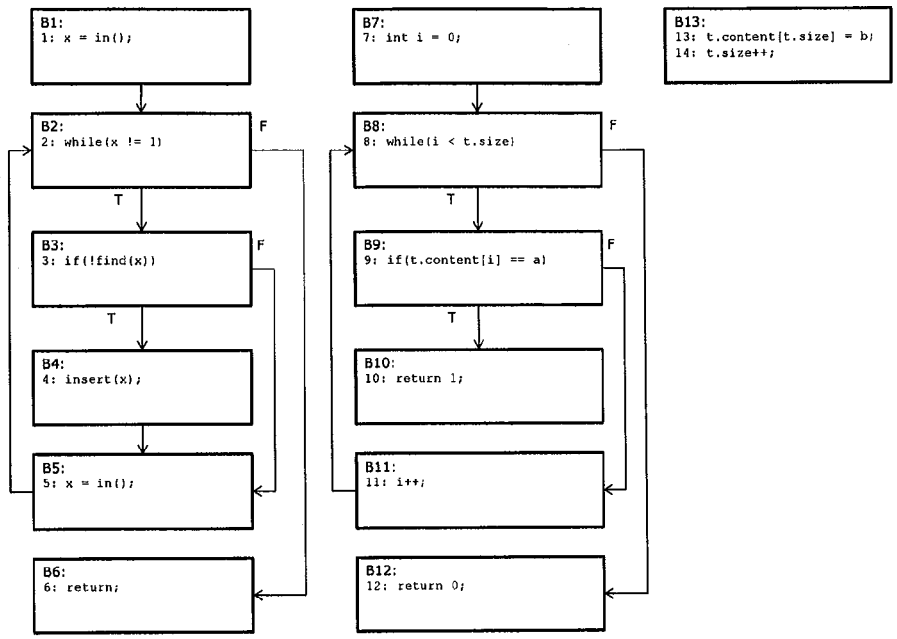
FIG. 13 is a drawing showing an example of a graph of basic blocks.

FIG. 13 shows an example of the graph of basic blocks for the program (a) shown in FIG. 4. The reference sign at the start of each node, such as B1, B2, and so forth, represent the basic block number. Hereinafter, the number of the basic block B and a string of statement numbers included therein will be respectively represented as ID(B), STMT(B).

Figure 14:
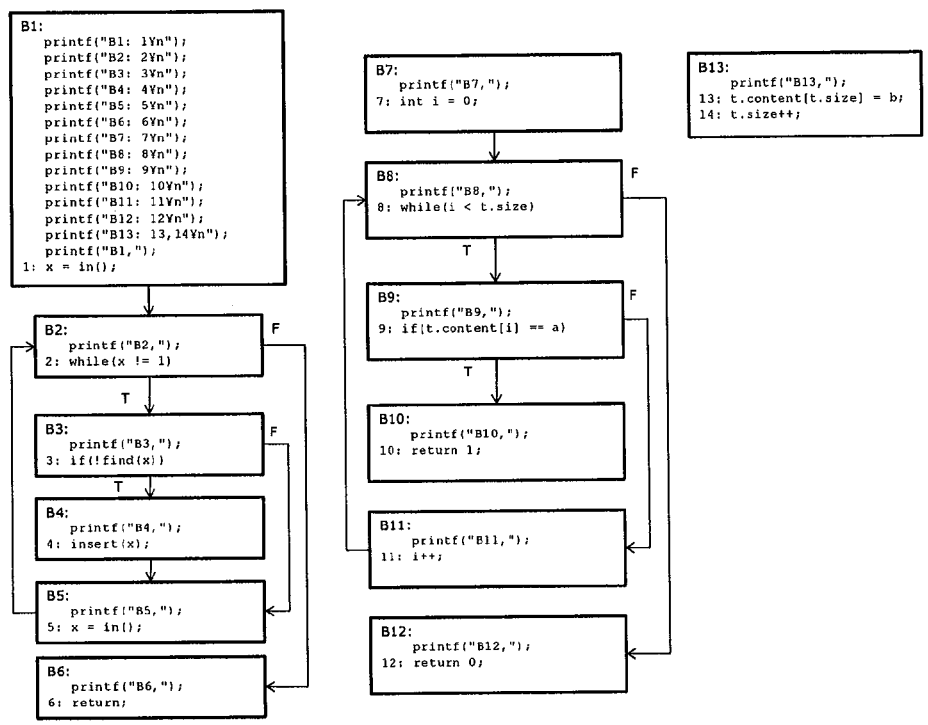
FIG. 14 is a drawing showing an example of the graph of basic blocks after a printf statement has been inserted.

Next, the compiler 110 inserts at the start of each basic block B a statement "printf("ID(B),");" that is to be outputted having the number ID(B) of the basic block as intermediate information 114. In addition, the compiler 110 inserts, into the basic block (B1 in FIG. 13) corresponding to the entry node, of the graph of basic blocks for the main function, the basic block numbers of all the basic blocks and a statement "printf("ID(B1): STMT (B1)¥n"); . . . ; printf("ID(Bn): STMT (Bn)¥n¥n";)" that is to be outputted having the string of statement numbers of the statements comprising the basic block as intermediate information 114. FIG. 14 shows the result obtained by applying this processing to the basic blocks of FIG. 13.

Lastly, the compiler 110, on the basis of normal compiler processing, generates an execution code 113 from the graph of basic blocks into which the printf statements have been inserted.

In accordance with this, when the execution code 113 has been executed, the relationship of the string of statement numbers corresponding to the basic block numbers and the string of basic block number that has been executed are recorded as intermediate information 114. The method described here is an example of a method for obtaining frequency of executions information, and has characteristics that make it possible to simplify a profiling process.

Next, in Step 202, a program executor 112 executes the execution code 113 with respect to the sample data 107, and generates the intermediate information 114. The sample data is input data described using a format that is processable by the program. Data (b) shown in FIG. 4 is an example of the sample data. This example includes three numerical data elements and a termination symbol (−1), and is processable by the program (a) shown in FIG. 4.

Figures 7, 8:
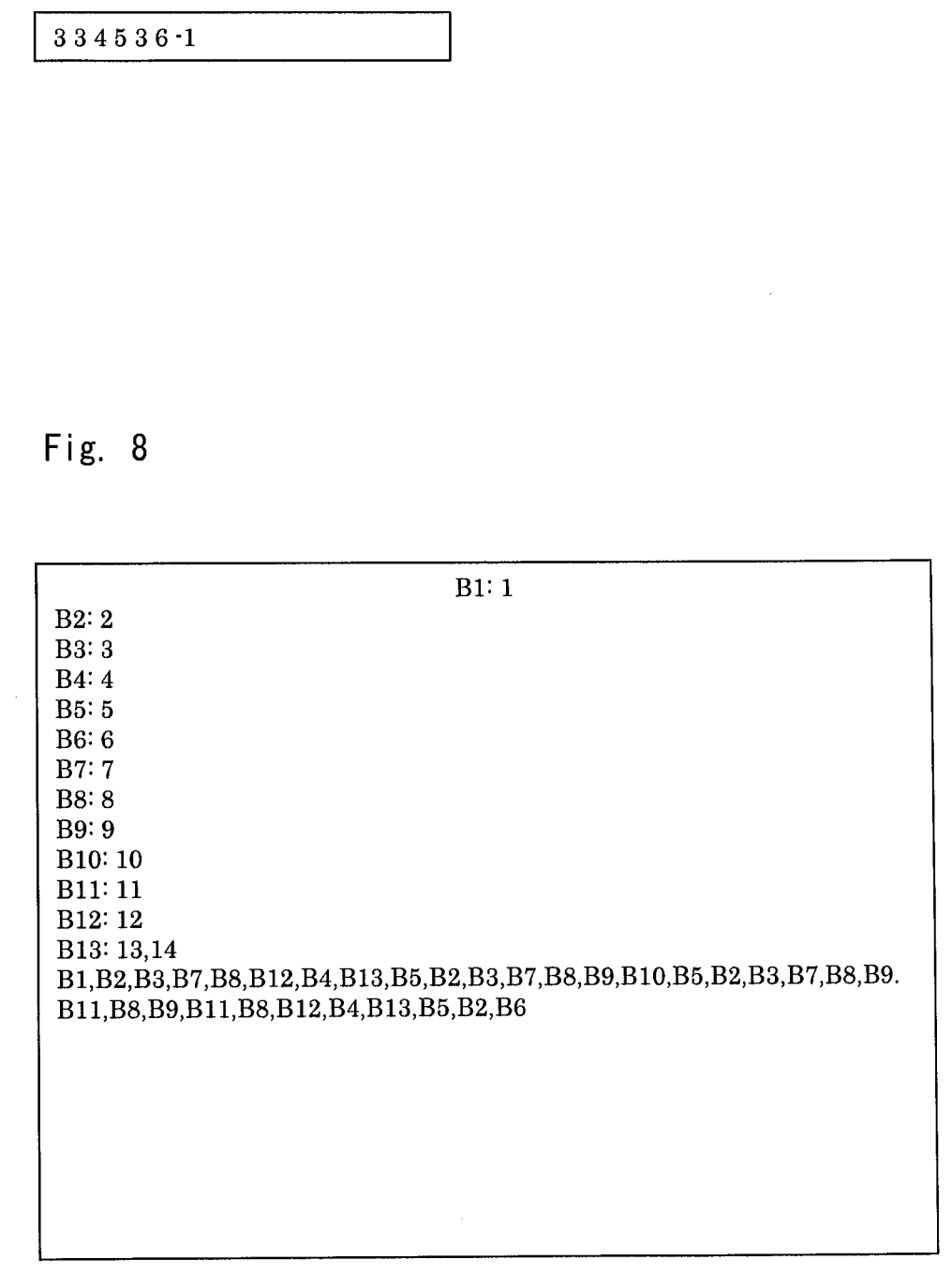

FIG. 8 shows the intermediate information 114 obtained by executing the execution code 113 obtained from the program (a) shown in FIG. 4 with respect to the data (b) shown in FIG. 4. The basic block number and the string of statement numbers of the statements comprising the basic block are represented by being delimited using the symbol ":" for each basic block number. For example, the string of statement numbers corresponding to the basic block number B13 is 13, 14. The last row is the string of basic block numbers that has been executed. This string denotes that the basic blocks have been executed in the described sequence from basic block number B1.

Next, in Step 203, a profiler 111 generates frequency of executions information 115 from the intermediate information 114. The frequency of executions information 115 arranges the statement numbers of the program in the sequence in which the statements were executed. An example of the frequency of executions information 115 is shown in FIG. 5. This example is the frequency of executions information 115 generated from the intermediate information 114 obtained by executing the execution code 113 obtained from the program (a) shown in FIG. 4 with respect to the data (b) shown in FIG. 4. For example, the first five elements of the string are [1,2,3,7,8], and this denotes that the execution of the program was performed in the sequence statement 1, statement 2, statement 3, statement 7, and statement 8.

The generation of the frequency of executions information 115 is performed by replacing the string of basic block numbers recorded in the intermediate information 114 with the string of statement numbers of the statements comprising the respective basic blocks. According to this processing, the frequency of executions information 115 of FIG. 5 is generated from the intermediate information 114 of FIG. 8. Furthermore, an ordinary profiler comprises various statistical processing functions, such as a function for displaying the number of executions for a function, and a function for displaying the number of executions therefor for each statement, but the only function required for the present invention is a one for obtaining a statement execution sequence string.

Lastly, in Step 204, the test data generation program 109 generates test data 116 for use in evaluating performance from the source program 106, the generation parameter 108 and the frequency of executions information 115. As used here, the generation parameter 108 is a parameter used for specifying the size of the test data to be generated. Specifically, the test data generation program 109 generates test data having a size that is a multiple of the generation parameter of the sample data size.

Figure 3:
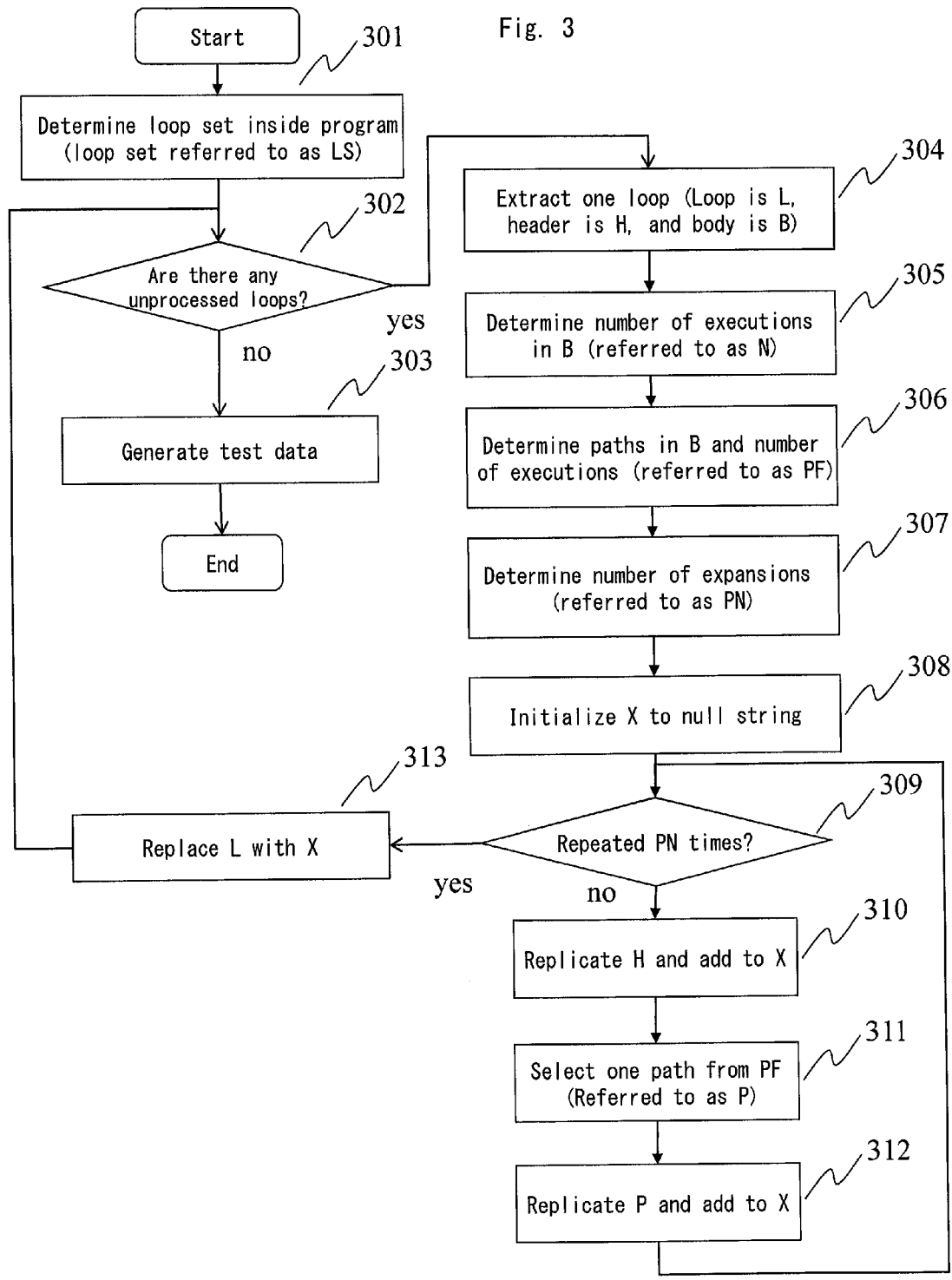
FIG. 3 is a drawing showing a detailed example of the data generation process.

FIG. 3 is a flowchart showing a detailed example of the flow of processing performed by the CPU 101 executing the test data generation program 109 in Step 204.

Firstly, in Step 301, the test data generation program 109 determines a set of all the loops (referred to as LS) from the source program 106. A loop comprises a header, which is a statement for determining a termination condition, and a body, which is a set of statements for performing iteration processing. This information can be found using the loop analysis method of the NPL 1.

Next, in Step 302, a check is performed as to whether there are any unprocessed loops left in the loop set LS, and when an unprocessed loop remains, the program 109 advances to Step 304 and extracts one loop (the extracted loop is L, the L header is H, and the L body is B).

Next, in Step 305, the program 109 determines the number of executions (referred to as N) for B based on the frequency of executions information 115.

Next, in Step 306, the program 109 determines all of the paths (program execution routes) in B and the number of executions for each path based on the frequency of executions information 115. A set of pairs formed from the paths and the number of executions thereof is referred to as PF. The paths in B are obtained from the frequency of executions information 115 by extracting a partial string sandwiched between the loop header H, removing statements other than B statements from the respective partial strings, and, in addition, removing redundancy. For example, in the frequency of executions information 115 of FIG. 5, there are three partial strings sandwiched between the loop header statement 2, i.e., [3,7,8,12,4,13,14,5], [3,7,8,9,10,5] and [3,7,8,9,11,8,9,11,8,9,11,8,12,4,13,14,5]. When statements other than B statements are removed therefrom, the result is [3,4,5], [3,5] and [3,4,5], and when the redundancy is removed, the two paths [3,4,5] and [3,5] are obtained. The number of executions for each path is the number of occurrences of the relevant path prior to redundancy being removed as described hereinabove. In the earlier example, the path [3,4,5] is executed two times and the path [3,5] is executed one time.

Next, in Step 307, the program 109 determines the number of expansions as the product of the generation parameter and N (referred to as PN).

Next, in Steps 308 through 312, the program 109 expands L PN times.

First, in Step 308, the program 109 initializes a statement string-holding variable X to a null string.

Next, in Step 309, the program 109 determines whether the processing of Steps 310 through 312 has been executed PN times (whether the iterations have reached PN times). In a case where PN iterations have been reached, the program 109 jumps to Step 313, and in a case where PN iterations have not been reached, advances to Step 310.

In Step 310, the program 109 replicates H, and adds the replicated H to the end of X after converting the last iteration determination statement of the replicated H to an assert statement that guarantees that the iterations have been achieved.

In Step 311, the program 109 selects one path from the PF (referred to as P). The selection is performed on the basis of the number of executions for each path. That is, the program 109 prepares a multiset that replicates each path of the PF by the number of executions, and randomly selects a path from thereamong. For example, in a case where the PF includes the three paths p1, p2, and p3, and the respective number of executions therefor is one time, two times, and three times, the program 109 prepares the multiset {p1, p2, p2, p3, p3, p3} and randomly selects an element from thereamong. In accordance with this, each path is selected at a ratio proportional to the number of executions.

In Step 312, the program 109 replicates P, and adds the replicated P to the end of X after converting a conditional branching statement inside the replicated P to the assert statement.

In Step 313, the program 109 replaces the L in the source program with X. The result of the replacement is referred to as PR. Thereafter, the program 109 returns to Step 302 and moves the processing to an unprocessed loop.

Finally, in Step 303, the test data generation program 109 generates input data that passes through all the X statements in the PR as test data. The generation can be performed using the method in NPL 2. The generation method is based on the symbolic execution method. The symbolic execution method determines a condition for executing a specified path while virtually executing a program using logical expressions of an execution state called a symbolic state. The symbolic state comprises memory content (a variable value or the like) and a path execution condition. In the initial state, the memory content is a formula representing the fact that the value of a variable clearly specified by the initial value in the program is identical to the specified value, and the execution condition is true.

The symbolic execution method starts from the initial state, and updates the state on the basis of the meaning of a statement while sequentially processing the specified path (string of statements). For example, in the case of an assignment statement, the symbolic execution method computes, on the basis of the current state, a formula representing a right-hand value, and replaces a left-hand value with this formula. Furthermore, in the case of an assert statement, a condition specified in the assert statement must be satisfied in order for path execution to continue. Thus, on the basis of the current state, the symbolic execution method computes a formula representing the contents of the specified condition and adds the formula to the execution condition. In the case of a function-call statement, the symbolic execution method moves to the beginning of a function defined inside the program and continues execution. For a function defined outside the program, such as a function for obtaining input data, the symbolic execution method expresses the result thereof by introducing a new logical variable.

After executing the assigned path up to the end, the symbolic execution method computes the value that the logical variable should take to satisfy the determined execution condition. This can be computed using a constraint solver tool such as the Satisfiability Modulo Theories Solver. The final test data is a string in which the values of the logical variables representing the result of the input data get function are arranged in order of occurrence.

Next, an example of the application of this example will be described in detail.

The characteristic features of the application example are that the input data has a structure and comprises iterations of a data element and a termination symbol, and that between the data elements there is a dependence relationship determined by the structure of the program. In accordance with this, the flow of program execution still change greatly between a case in which the program is executed using test data generated by simply replicating the sample data and a case in which the program is executed using the sample data, thereby making it impossible to perform an appropriate performance evaluation. Therefore, the utilization of test data generated using the methods shown in FIGS. 2 and 3 is important for an appropriate program performance evaluation.

Application Example 1

In this application example, the source program (a), sample data (b), and generation parameter (c) shown in FIG. 4 are used as the input data.

Furthermore, in this application example, the statements (execution instructions) inside the source program are shown using the row numbers of the source program (a).

In the source program (a) of FIG. 4, the statements (row numbers) 1 through 5 are a loop for sequentially processing the input data. In the sample data (b) of FIG. 4, −1 is the termination symbol representing the end of the data.

As described hereinabove, as a result of Step 203 of FIG. 2, the frequency of executions information 115 shown in FIG. 5 is generated.

Next, in Step 204, the test data generation program 109 generates the test data on the basis of the structure of the source program.

Step 204 will be explained in accordance with the detailed explanation of FIG. 3. Firstly, the program 109 determines the loop set from the source program in Step 301. As a result of analyzing the loop, {(2, [3,4,5])} is obtained as the loop set LS. The loop (2, [3,4,5]), which is an element of the LS here, comprises a pair formed from the header 2 and the body [3,4,5].

Next, in Step 302, the program 109 checks whether there are any unprocessed loops left in the loop set LS, advances to Step 304, and extracts one unprocessed loop. At this point, (2, [3,4,5]) is extracted as the loop L. The header H is 2, and the body is [3,4,5].

Next, in Step 305, the program 109 determines the number of executions N for the B based on the frequency of executions information. Since the first statement (statement 3) in the B is always executed every time the B is executed, the number of execution for the B is identical to the number of executions for statement 3. Based on the frequency of executions information shown in FIG. 5, 3 is obtained as N.

Next, in Step 306, based on the frequency of executions information, the program 109 determines the set PF of pairs formed from all of the paths in the B and the number of executions therefor. From the information in FIG. 5, {([3,4,5], 2), ([3,5], 1)} is obtained as the PF. The numerals described inside the brackets [ ] here is the path that passes through the statements shown using the respective row numbers, and the numeral described after the brackets [ ] inside the parentheses ( ) is the number of executions for the relevant path.

Next, in Step 307, the program 109 determines the PN, the product of the generation parameter and N. Since the generation parameter (c) shown in FIG. 4 is currently "2", 6 is obtained as the PN.

Next, in Steps 308 through 312, the program 109 expands L six-fold. In Step 308, the program 109 initializes statement string-holding variable X to a null string. Next, the program 109 repeats Steps 310 through 312 six times.

In Step 310, the program 109 replicates H (2), converts statement 2, which is the iteration determination statement, to an assert statement that guarantees that the iterations have been achieved, and adds the replicated H to the end of X. In accordance with this, X becomes [assert(x !=−1)].

In Step 311, the program 109 selects one path from the PF on the basis of the number of executions for each path. It is assumed that P=[3,4,5] is selected as the path here.

In Step 312, the program 109 replicates P, and adds the replicated P to the end of X after converting a conditional branching statement inside the P to the assert statement. In accordance with this, X becomes [assert(x !=−1), assert(!find (x)), insert (x), x=in( )].

By performing the processing in a similar manner thereafter, when the iterations of Steps 310 through 312 have ended, X becomes [assert(x !=−1), assert (!find(x)), insert(x), x=in( ), assert(x !=−1), assert(find(x)), x=in( ), assert(x !=−1), assert(!find(x)), insert(x), x=in( ), assert(x !=−1), assert(!find (x)), insert(x), x=in( ), assert(x !=−1), assert(find (x)), x=in( ), assert(x !=−1), assert(!find(x)), insert(x), x=in( ), assert(x==−1)].

Next, in Step 313, the program 109 replaces the L in the source program 106 with the X. The main function that results from the replacement is shown in FIG. 6.

Next, the program 109 returns to Step 302, and since there are no unprocessed loops remaining in the LS, advances to Step 303.

Lastly, in Step 303, as test data, the program 109 generates input data that passes through all the statements corresponding to the X of the program in FIG. 6. Test data such as that in FIG. 7 is obtained by using the method in the NPL 2. The fact that the test data of FIG. 7 reflects the sample data tendency will be explained.

The sample data (b) of FIG. 4 comprises three elements (1,1,2) and a termination symbol (−1). In a case where a program is executed having this sample data (a) as input, the first element (1) and the third element (2) are inserted (insert ( ) is called), but the second element (1) is not inserted since the same value has already been inserted. That is, data for which insert ( ) is called and data for which insert ( ) is not called are included in a ratio of 2:1.

In a case where the program is executed having the generated test data of FIG. 7 as input, the first (3), the third (4), the fourth (5), and the sixth (6) elements are inserted, and the second (3) and the fifth (3) elements are not inserted. That is, data for which insert ( ) is called and data for which insert ( ) is not called are included in a ratio of 2:1 the same as in the sample data. It is thus clear that the frequency of execution for each part of the source program (that is, the ratio of the number of executions for each statement of the source program) is maintained the same as in the sample data and the generated test data.

By contrast, in a case where the sample data is simply replicated and made two fold, the sample data is replicated up to the −1, which is the termination symbol, and as such, the amount of data to be processed does not become two fold. Hypothetically speaking, in a case where the termination symbol has been specially processed manually, the data obtained becomes [1 1 2 1 1 2 −1]. In a case where the program is executed having this data as input, the first (1) and the third (2) elements are inserted, and the second (1), the fourth (1), the fifth (1), and the sixth (2) elements are not inserted. That is, unlike the sample data, the data for which insert ( ) is called and the data for which insert ( ) is not called are included in a ratio of 1:2, and as such, the frequency of executions differs greatly from the sample data tendency.

Application Example 2

The source program (a) shown in FIG. 4 that was used in the first application example only has one input processing loop. Accordingly, a second application example shows a case in which there is a plurality of input processing loops. In this application example, the source program (a), the sample data (b), and the generation parameter (c) shown in FIG. 9 are used as the input data. Furthermore, in this application example, the statements (execution instructions) inside the source program (a) are shown using the row numbers of the source program (a) shown in FIG. 9.

In the source program (a) of FIG. 9, the statements (row numbers) 2 through 5 and 7 through 9 are loops for sequentially processing input data. In the sample data (b) of FIG. 9, −1 and −2 are markers representing the end of data.

As a result of Step 203 of FIG. 2, the frequency of executions information shown in FIG. 10 is generated.

Next, in Step 204, the test data generation program 109 generates the test data on the basis of the structure of the source program.

Step 204 will be explained in accordance with the detailed explanation of FIG. 3. Firstly, in Step 301, the program 109 determines the loop set from the source program. As a result of loop analysis, {(2, [3,4,5]), (7, [8,9])} are obtained as the loop set LS. The loops (2, [3,4,5]) and (7, [8,9]), which are elements of the LS here, are each pairs formed from the headers and the main bodies.

Next, in Step 302, the program 109 checks whether there are any unprocessed loops left in the loop set LS, advances to Step 304, and extracts one unprocessed loop. At this point, (2, [3,4,5]) is extracted as the loop L. The header H is 2, and the body is [3,4,5]. The processing from Step 305 through Step 313 is the same as that for the first application example above.

Next, the program 109 returns to Step 302, checks whether there are any unprocessed loops left in the LS, advances to Step 304, and extracts one unprocessed loop. At this point, (7, [8,9]) is extracted as the loop L. The header H is 7, and the body is [8,9].

Next, in Step 305, the program 109 determines the number of executions N for the B based on the frequency of executions information. Based on the frequency of executions information shown in FIG. 5, 2 is obtained as N.

Next, in Step 306, based on the frequency of executions information, the program 109 determines the set PF of pairs formed from all of the paths in the B and the number of executions therefor. From the information in FIG. 5, {([8,9], 2)} is obtained as the PF.

Next, in Step 307, the program 109 determines the product PN of the generation parameter and N. Based on the information in FIG. 4 (c), the generation parameter is currently "2", and as such, 4 is obtained as the PN.

Next, in Steps 308 through 312, the program 109 expands L four-fold. In Step 308, the program 109 initializes statement string-holding variable X to a null string. Next, the program 109 repeats Steps 310 through 312 four times.

In Step 310, the program 109 replicates H (2), converts statement 7, which is the iteration determination statement, to an assert statement that guarantees that the iterations have been achieved, and adds the replicated H to the end of the X. In accordance with this, the X becomes [assert(z !=-2)].

In Step 311, the program 109 selects one path from the PF on the basis of the number of executions for each path. P=[8, 9] is selected as the path.

In Step 312, the program 109 replicates P, and adds the replicated P to the end of the X after converting a conditional branching statement inside the P to the assert statement. In accordance with this, the X becomes [assert(z !=-2), insert (z), z=in( )].

By performing the processing in a similar manner thereafter, when the iterations of Steps 310 through 312 have ended, the X becomes [assert(z !=-2), insert(z), z=in assert(z !=-2), insert(z), z=in( ), assert(z !=-2), insert(z), z=in( ), assert(z !=-2), insert(z), z=in( ), assert(z==-2)].

Next, in Step 313, the program 109 replaces the L in the source program 106 with the X. The main function that results from the replacement is shown in FIG. 11.

Next, the program 109 returns to Step 302, and since there are no unprocessed loops remaining in the LS, advances to Step 303.

Lastly, in Step 303, the program 109 generates, as test data, input data that passes through all the statements corresponding to the X of the program in FIG. 11. Test data such as that in FIG. 12 is obtained by using the method in the NPL 2.

The present invention is not limited to the examples described hereinabove, and a variety of variations are possible. For example, the examples described hereinabove have been explained in detailed to make the explanation of the present invention easy to understand, and are not necessarily limited to examples comprising all of the configurations that have been explained. A portion of the configuration of a certain example can be replaced with another configuration, and another configuration can be added to the configuration of a certain example. It is also possible to add, delete, or replace a portion of the configuration of an example with another configuration.

Furthermore, each of the configurations, functions, processing parts, processing means and so forth described hereinabove may be realized either wholly or in part, for example, using hardware by designing an integrated circuit. Each of the configurations, functions and so forth described hereinabove may be realized using software in accordance with a processor interpreting and executing a program that realizes the respective functions. The program, files and other such information for realizing the functions can be stored on a recording device such as a memory, hard disk of SSD (Solid State Drive), or on a recording medium such as an IC card, SD card or DVD.

REFERENCE SIGNS LIST

101 CPU
102 Main storage apparatus
103 External storage apparatus
104 Display
105 Keyboard
106 Source program
107 Sample data
108 Generation parameter
109 Test data generation program
110 Compiler
111 Profiler
112 Program executor
113 Intermediate information
114 Frequency of executions information

The invention claimed is:

1. A method for generating test data used in evaluating a performance of a program, comprising:
    an input step of receiving, from an input device, a source program targeted for performance evaluation, sample data, and a generation parameter used for determining a size of the test data to be generated;
    a number-of-executions acquisition step of a processor executing the source program using the sample data and obtaining the number of executions for each of a plurality of statements in the source program; and
    a test data generation step of the processor generating, on the basis of the obtained number of executions, test data having a size that is a multiple of the generation parameter of a size of the sample data, the test data being such that the frequency of executions for each of the plurality of statements in the source program is the same as the frequency of executions for each of the plurality of statements when executing the source program using the sample data.

2. A test data generation method according to claim 1, wherein the frequency of executions is a ratio of the number of executions of each statement in the source program.

3. A test data generation method according to claim 1, wherein the number-of-executions acquisition step comprises:

a step of generating, from the source program, a graph of basic blocks having a plurality of basic blocks forming the source program;

a step of inserting, into the graph of basic blocks, a first instruction for outputting, for each of the plurality of basic blocks, a basic block number of the basic block and a statement number for each of one or more statements included in the basic block;

a step of inserting a second instruction for outputting, for each of the plurality of basic blocks, a basic block number of the basic block, into the relevant basic block;

a step of generating an execution code by compiling the graph of basic blocks into which the first instruction and one or more of the second instructions have been inserted;

a step of obtaining, as intermediate information, information to be outputted in accordance with the first instruction and one or more of the second instructions by executing the execution code using the sample data; and a step of obtaining, from the intermediate information, the number of executions for each of the plurality of statements in the source program.

4. A test data generation method according to claim 3, wherein the test data generation step comprises:

a loop analysis step of performing loop analysis on the source program to extract one or more loops included in the source program;

a step of obtaining, for each of the one or more loops, the number of loop executions, which is the number of executions for the relevant loop, on the basis of the number of executions;

a step of obtaining, for each of the one or more loops, one or more paths, which are program execution routes within the relevant loop, and the number of path executions, which is the number of executions of the relevant path;

a loop expansion step of expanding, for each of the one or more loops, the relevant loop by a multiple of a value of a product of the generation parameter and the number of loop executions for the relevant loop; and a data generation step of generating input data that passes through all statements included in the post-loop expansion source program.

5. A test data generation method according to claim 4, wherein in the data generation step, a symbolic execution method is used to generate input data that passes through all statements included in the post-loop expansion source program.

6. A test data generation method according to claim 4, wherein in the loop expansion step, for each of the one or more loops, the relevant loop is expanded on the basis of the number of path executions for each path included in the relevant loop.

7. A computer for generating test data used in evaluating a performance of a program, comprising:

an input device for receiving a source program targeted for performance evaluation, sample data, and a generation parameter used for determining a size of the test data to be generated; and a processor for executing:

a number-of-executions acquisition step of executing the source program using the sample data and obtaining the number of executions for each of a plurality of statements in the source program; and a test data generation step of generating, on the basis of the obtained number of executions, test data having a size that is a multiple of the generation parameter of a size of the sample data, the test data being such that the frequency of executions for each of the plurality of statements in the source program is the same as the frequency of executions for each of the plurality of statements when executing the source program using the sample data.

8. A computer according to claim 7, wherein, in the number-of-executions acquisition step, the processor:

generates, from the source program, a graph of basic blocks having a plurality of basic blocks forming the source program;

inserts, into the graph of basic blocks, a first instruction for outputting, for each of the plurality of basic blocks, a basic block number of the basic block and a statement number for each of one or more statements included in the basic block;

inserts a second instruction for outputting, for each of the plurality of basic blocks, a basic block number of the basic block, into the relevant basic block;

generates an execution code by compiling the graph of basic blocks into which the first instruction and one or more of the second instructions have been inserted;

obtains, as intermediate information, information to be outputted in accordance with the first instruction and one or more of the second instructions by executing the execution code using the sample data; and obtains, from the intermediate information, the number of executions for each of the plurality of statements in the source program.

9. A computer according to claim 8, wherein, in the test data generation step, the processor:

performs loop analysis on the source program to extract one or more loops included in the source program;

obtains, for each of the one or more loops, the number of loop executions, which is the number of executions for the relevant loop, on the basis of the number of executions;

obtains, for each of the one or more loops, one or more paths, which are program execution routes within the relevant loop, and the number of path executions, which is the number of executions of the relevant path;

expands, for each of the one or more loops, the relevant loop on the basis of the number of path executions for each path included in the relevant loop by a multiple of a value of a product of the generation parameter and the number of loop executions for the relevant loop; and generates input data that passes through all statements included in the post-loop expansion source program.

10. A recording medium that records a program executed by a computer for generating test data used in evaluating a performance of a program, the program comprising:

a code for receiving a source program targeted for performance evaluation, sample data, and a generation parameter used for determining a size of the test data to be generated;

a code for executing a number-of-executions acquisition step of executing the source program using the sample data and obtaining the number of executions for each of a plurality of statements in the source program; and a code for executing a test data generation step of generating, on the basis of the obtained number of executions, test data having a size that is a multiple of the generation parameter of a size of the sample data, the test data being such that the frequency of executions for each of the plurality of statements in the source program is the same as the frequency of executions for each of the plurality of statements when executing the source program using the sample data.

11. A recording medium according to claim 10, wherein the code for executing the number-of-executions acquisition step comprises a code for:
generating, from the source program, a graph of basic blocks having a plurality of basic blocks forming the source program;
inserting, into the basic block graph, a first instruction for outputting, for each of the plurality of basic blocks, a basic block number of the relevant basic block and a statement number for each of one or more statements included in the basic block;
inserting a second instruction for outputting, for each of the plurality of basic blocks a basic block number of the basic block, into the relevant basic block;
generating an execution code by compiling the graph of basic blocks into which the first instruction and one or more of the second instructions have been inserted;
obtaining, as intermediate information, information to be outputted in accordance with the first instruction and one or more of the second instructions by executing the execution code using the sample data; and
obtaining, from the intermediate information, the number of executions for each of the plurality of statements in the source program.

12. A recording medium according to claim 11, wherein in the code for executing the test data generation step comprises a code for:
performing loop analysis on the source program to extract one or more loops included in the source program;
obtaining, for each of the one or more loops, the number of loop executions, which is the number of executions for the relevant loop, on the basis of the number of executions;
obtaining, for each of the one or more loops, one or more paths, which are program execution routes within the relevant loop, and the number of path executions, which is the number of executions of the relevant path;
expanding, for each of the one or more loops, the relevant loop on the basis of the number of path executions for each path included in the relevant loop by a multiple of a value of a product of the generation parameter and the number of loop executions for the relevant loop; and
generating input data that passes through all statements included in the post-loop expansion source program.

* * * * *